(12) United States Patent  (10) Patent No.: US 7,967,035 B2
Brunn  (45) Date of Patent: Jun. 28, 2011

(54) METHOD AND SYSTEM FOR THE QUICK REFILL OF AN IRRITANT DISPENSER

(76) Inventor: Michael Brunn, Sea Cliff, NY (US)

( * ) Notice: Subject to any disclaimer, the term of this patent is extended or adjusted under 35 U.S.C. 154(b) by 39 days.

(21) Appl. No.: 11/981,119

(22) Filed: Oct. 31, 2007

(65) Prior Publication Data

US 2008/0163954 A1    Jul. 10, 2008

Related U.S. Application Data

(62) Division of application No. 10/931,555, filed on Sep. 1, 2004, now Pat. No. 7,387,140.

(60) Provisional application No. 60/499,860, filed on Sep. 3, 2003.

(51) Int. Cl.
*B65B 31/00* (2006.01)
*F16L 37/28* (2006.01)

(52) U.S. Cl. ............. 141/20; 141/3; 141/346; 141/383; 141/387; 141/389; 251/149.1

(58) Field of Classification Search .................. 141/2, 3, 141/18, 20, 346–348, 383, 387–389; 222/394, 222/399; 251/149.1; 137/208, 572
See application file for complete search history.

(56) References Cited

U.S. PATENT DOCUMENTS

| | | | | |
|---|---|---|---|---|
| 2,494,454 | A * | 1/1950 | Ritchie | ............ 53/408 |
| 3,158,298 | A | 11/1964 | Briechle | |
| 3,974,945 | A | 8/1976 | Burger | |
| 4,454,963 | A | 6/1984 | Fegley | |
| 4,656,685 | A | 4/1987 | Wood | |
| 4,854,480 | A | 8/1989 | Shindo | |
| 5,086,977 | A | 2/1992 | Kah, Jr. | |
| 5,174,343 | A | 12/1992 | Rood | |
| 5,284,300 | A | 2/1994 | Gries | |
| 5,404,909 | A | 4/1995 | Hanson | |
| 5,509,581 | A | 4/1996 | Parsons | |
| 5,514,026 | A | 5/1996 | Schaffer | |
| 5,590,719 | A | 1/1997 | McLoughlin et al. | |
| 5,647,591 | A | 7/1997 | Parsons | |
| 5,649,723 | A * | 7/1997 | Larsson | ............ 285/34 |
| 5,839,624 | A | 11/1998 | Parsons | |
| 5,842,601 | A | 12/1998 | Pierpoint | |
| 5,842,602 | A | 12/1998 | Pierpoint | |
| 6,003,547 | A * | 12/1999 | Tippmann, Jr. | ............ 137/588 |
| 6,158,482 | A * | 12/2000 | Rubin | ............ 141/59 |
| 6,199,726 | B1 | 3/2001 | Cardwell, III et al. | |
| 6,398,134 | B1 | 6/2002 | Hickson et al. | |
| 6,405,738 | B1 | 6/2002 | Clark et al. | |
| 6,520,178 | B1 | 2/2003 | Baker | |
| 6,540,304 | B2 | 4/2003 | Southern | |
| 6,591,857 | B2 | 7/2003 | Engle et al. | |
| 6,651,702 | B2 | 11/2003 | Marino | |
| 6,702,033 | B1 | 3/2004 | Mitchell et al. | |
| 6,772,793 | B2 | 8/2004 | Warning | |
| 6,955,194 | B2 * | 10/2005 | MacNeal et al. | ............ 141/4 |
| 6,994,126 | B2 | 2/2006 | Marino | |
| 7,490,864 | B2 * | 2/2009 | Cheng | ............ 285/317 |
| 2004/0129730 | A1 | 7/2004 | Parsons | |
| 2004/0137988 | A1 | 7/2004 | Parsons | |

* cited by examiner

*Primary Examiner* — Timothy L Maust
(74) *Attorney, Agent, or Firm* — Bennet K. Langlotz; Langlotz Patent and Trademark Works, Inc.

(57) ABSTRACT

A system and method for quickly refilling a pressurized irritant dispenser is disclosed. In the system and method, either the dispensing nozzle or the connection between the dispensing nozzle and the valve assembly is replaced with a quick connect fitting. The quick connect fitting allows for both the quick refill of irritant and the quick attachment (and detachment) of various accessories to the pressurized irritant dispenser.

24 Claims, 7 Drawing Sheets

METHOD AND SYSTEM FOR THE QUICK REFILL OF AN IRRITANT DISPENSER

CROSS-REFERENCE OF RELATED APPLICATIONS

This is a divisional of application Ser. No. 10/931,555, filed on Sep. 1, 2004 now U.S. Pat. No. 7,387,140, which claims priority from U.S. Provisional Patent Application 60/499,860 which was filed on Sep. 3, 2003, and which is hereby incorporated in its entirety.

BACKGROUND OF THE INVENTION

1. Field of the Invention

The present invention relates generally to the dispensing nozzle on a hand-held pressurized fluid dispenser, and particularly to the dispensing nozzle of an pressurized irritant dispenser.

2. Description of the Related Art

The use of irritant sprayers such as "pepper sprays" is common within law enforcement agencies. An exemplary irritant dispenser is shown in FIG. 1; this unit (manufactured by Combined Tactical Systems, Inc., Jamestown, Pa.) dispenses irritant liquid under pressure, and is similar in size to, and shares many common components with, a fire extinguisher. FIG. 1 shows the unit equipped with a standard dispensing nozzle. The orifice in the dispensing nozzle is designed to dispense the liquid in a specific form, e.g., thin or wide stream, fine or coarse mist, etc. The unit is capable of being refilled, but the refill process requires many steps and an additional fitting.

Prior Art Refill Procedure

In the prior art, refilling a refillable pressurized liquid dispenser of irritants or other less-lethal pressurized liquids requires the following sequence of steps, some of which are shown in FIGS. 2-6B:
1. Unscrew and remove valve assembly (with attached nozzle) (FIGS. 2A & 2B).
2. Pour liquid through opening (not shown).
3. Reattach valve assembly to unit (FIG. 3).
4. Remove dispensing nozzle from valve assembly (FIG. 4).
5. Attach male quick connect fitting to valve assembly (FIGS. 5A & 5B).
6. Connect the female quick connect fitting of the pressurizing hose to the male quick connect fitting (FIGS. 6A & 6B).
7. Pressurize (with an appropriate propellant, such as compressed air or nitrogen) by opening valve on pressurizing hose.
8. Close valve on pressurizing hose (once the contents of the liquid dispenser are appropriately pressurized).
9. Disconnect pressurizing hose from male quick connect fitting on the valve assembly.
10. Remove male quick connect fitting from valve assembly.
11. Reconnect dispensing nozzle to valve assembly.

However, in an emergency and/or hostile situation, this lengthy series of steps can be unduly onerous and perhaps dangerously wasteful of time. For example, when law enforcement personnel are using irritant dispensers to disperse or otherwise control a crowd or a group of people, one or more personnel will have to leave the area in order to safely perform the refilling procedure, thereby reducing the manpower available for controlling the crowd.

Thus, there is a need for a system or method which will reduce the complexity of the refill procedure for a pressurized irritant dispenser.

SUMMARY OF THE INVENTION

The present invention is directed to a system of fittings and/or connectors for the input/output valve of a refillable pressurized liquid dispenser of irritants or other less-lethal pressurized liquids. In particular, the present inventive system provides a dispensing nozzle that streamlines the refilling process by eliminating the number of operations normally required. Furthermore, the present inventive system facilitates the quick attachment of various accessories to the input/output valve of the unit. Moreover, the present invention could be applied to disposable pressurized dispensers in order to make them reusable, or to other types of hand-held pressurized dispensers, such as fire extinguishers.

Other objects and features of the present invention will become apparent from the following detailed description considered in conjunction with the accompanying drawings; whereas the various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIGS. 2A through 6B show the prior art procedure for refilling a pressurized irritant dispenser, and more specifically:

FIGS. 2A-2B show the steps of unscrewing and removing the valve assembly;

FIG. 3 shows the step of reattaching the valve assembly;

FIG. 4 shows the step of removing the dispensing nozzle from the valve assembly according to the prior art;

FIGS. 6A-6B shows the step of connecting the female quick connect fitting of a pressurizing hose to the male quick connect fitting according to the prior art;

DETAILED DESCRIPTION OF THE PRESENTLY PREFERRED EMBODIMENTS

The present invention is directed to a system of quick connect fittings for the input/output valve of a refillable pressurized liquid dispenser of irritants or other less-lethal pressurized liquids (although, as noted above, the present invention could be applied to disposable dispensers and/or other types of hand-held pressurized fluid dispensers). Furthermore, although the phrase "pressurized fluid" or "fluid dispenser" and the like are used herein, it should be understood that any substance, whether solid, fluid, or gas, which is capable of being dispensed by a pressurized dispenser, could be used in accordance with the present invention.

The Quick Connect System

The make and female quick connect fittings shown in FIGS. 5A-B & 6A-B are based on the well-known "quick connect" standard which is used in hydraulic and pneumatic systems for quickly connecting and disconnecting lines and instruments without losing fluid pressure. An exemplary prior art use is for gas cylinder connectors such as used with barbeque grills. Quick connect fittings do not require tools for connection and disconnection.

Figure 7A:
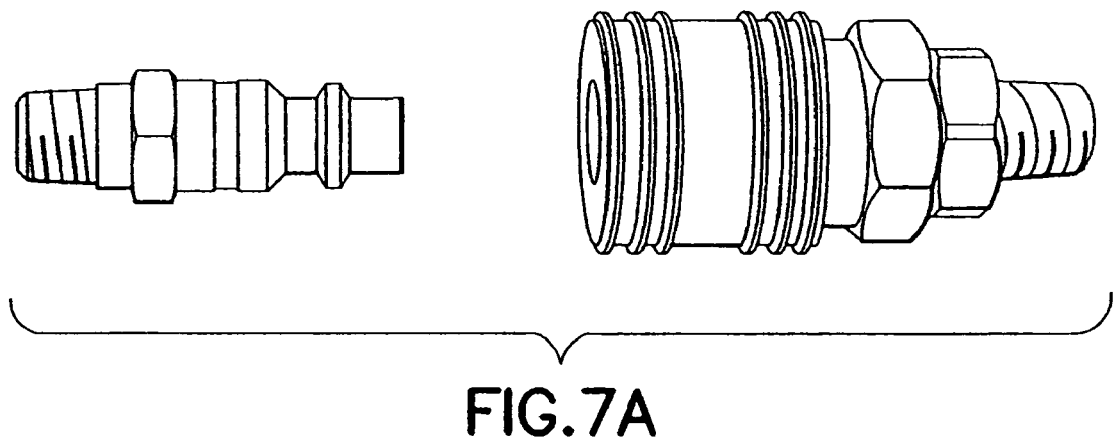
FIGS. 7A-7B-7C show how a male quick connect dispensing nozzle according to a preferred embodiment of the present invention is capable of securely connecting with a female quick connect counterpart.
Figure 7B:
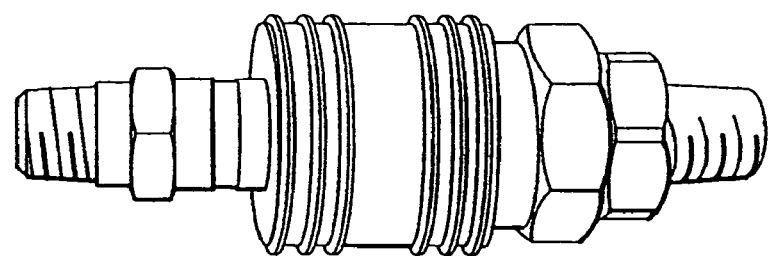
Figure 7C:
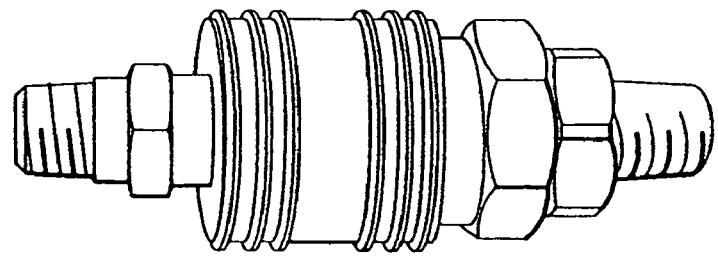

Exemplary male and female quick connect fittings are shown in FIGS. 7A, 7B, and 7C. The exemplary male fitting has threading on one side for permanent connection (to a hose, instrument, or device) and the male quick connect standard 'plug' on the other side for removable connection. Herein, the term 'plug' is intended to refer to a protrusion capable of insertion into, and detachable engagement with, a 'socket'; thus, the term 'plug' as used herein does not denote, in any way, shape, or form, an instrument for stopping a fluid flow, except of the limited sense that a fluid is substantially stopped from exiting a quick connect fitting (although the fluid may flow through the internal channels of two connected and engaged quick connect fittings).

The exemplary female quick connect fitting also has threading on one side and the female quick connect 'socket' on the other side. The female quick connect fitting has a built-in valve in order to restrain pressurized fluids or gasses when it is 'open', i.e., when it is not connected to a male quick connect fitting. In order to plug the male quick connect fitting into the female quick connect socket, one must pull the "sleeve" which envelops or encircles the female quick connect socket so that the quick connect plug can be appropriately engaged in the interior of the quick connect socket.

The Two Presently Preferred Systems

There are two presently preferred types of systems according to the present invention:

(1) a unit with a dispensing nozzle whose outer envelope is a quick connect fitting; and (2) a unit whose nozzle assembly is a quick connect fitting.

Figure 1:
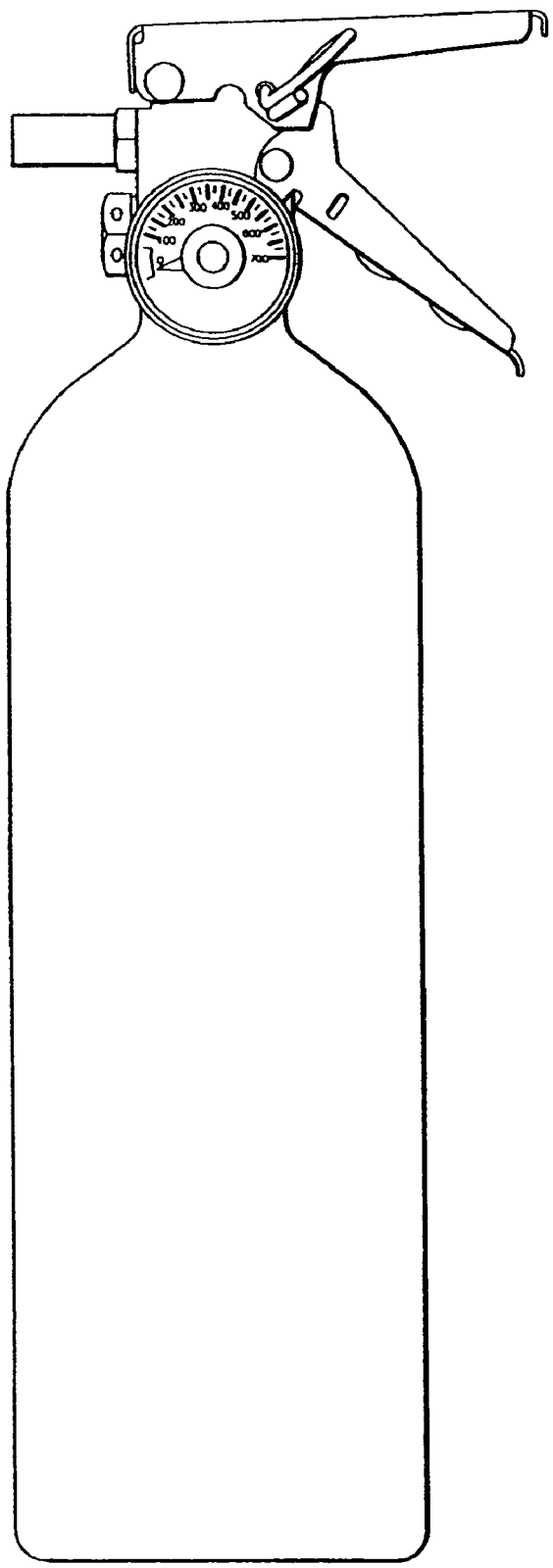
FIG. 1 shows a pressurized irritant dispenser according to the prior art.
Figures 2A, 2B:
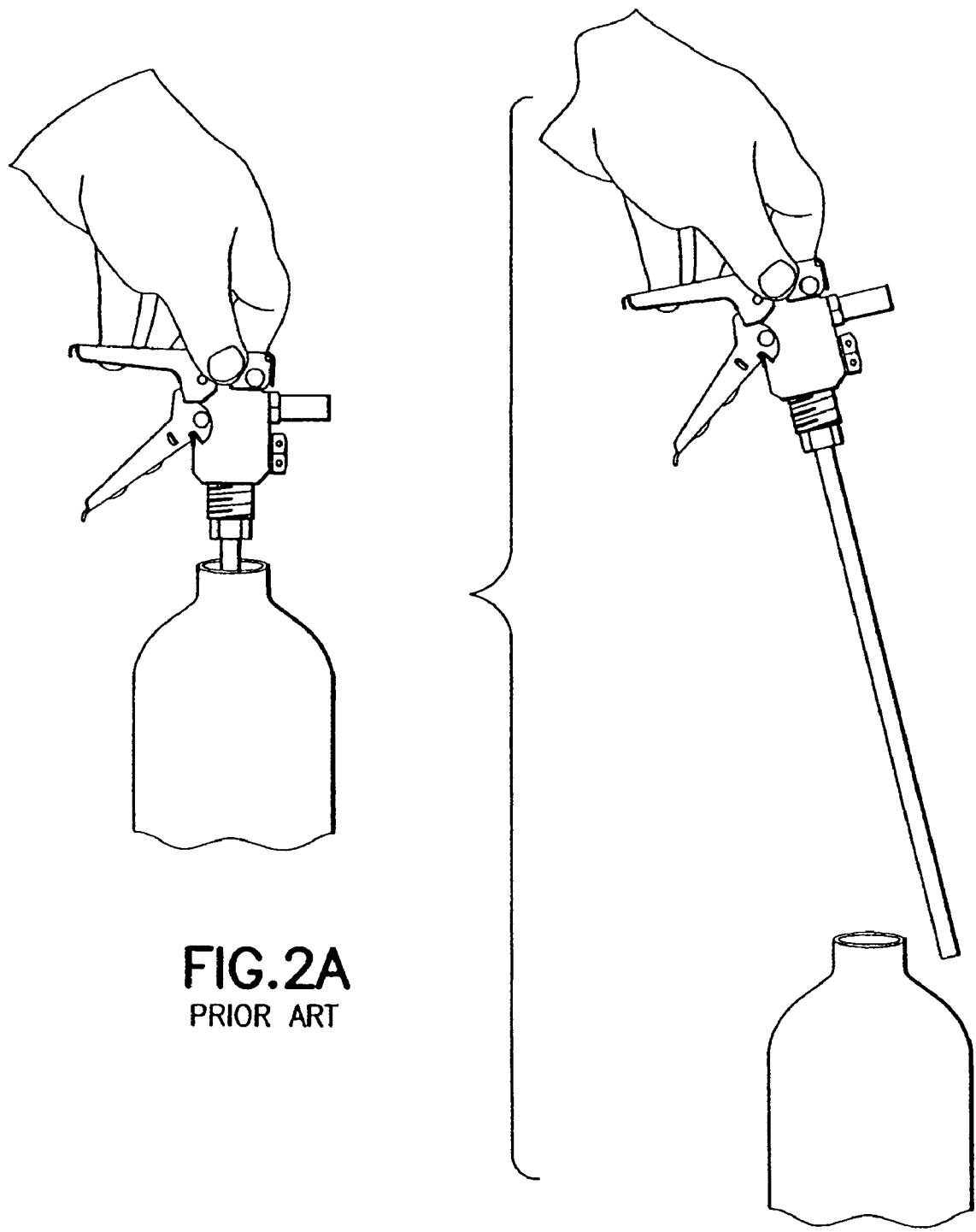
Figure 3:
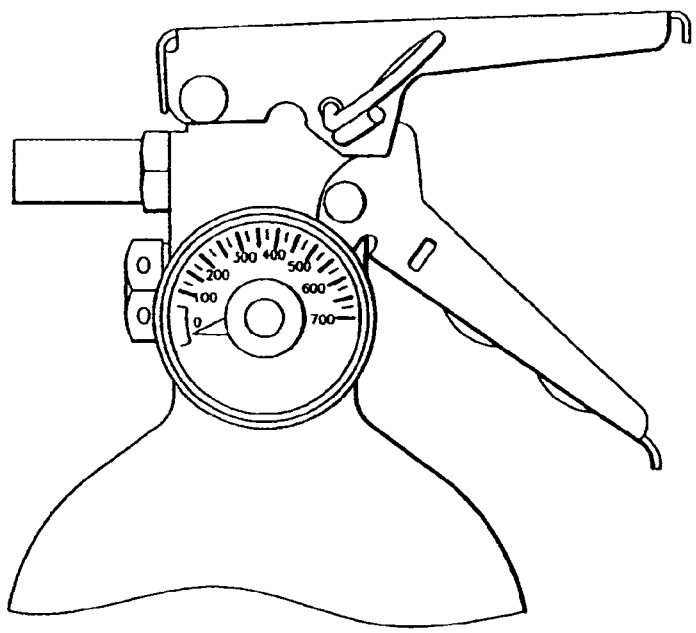
Figure 4:
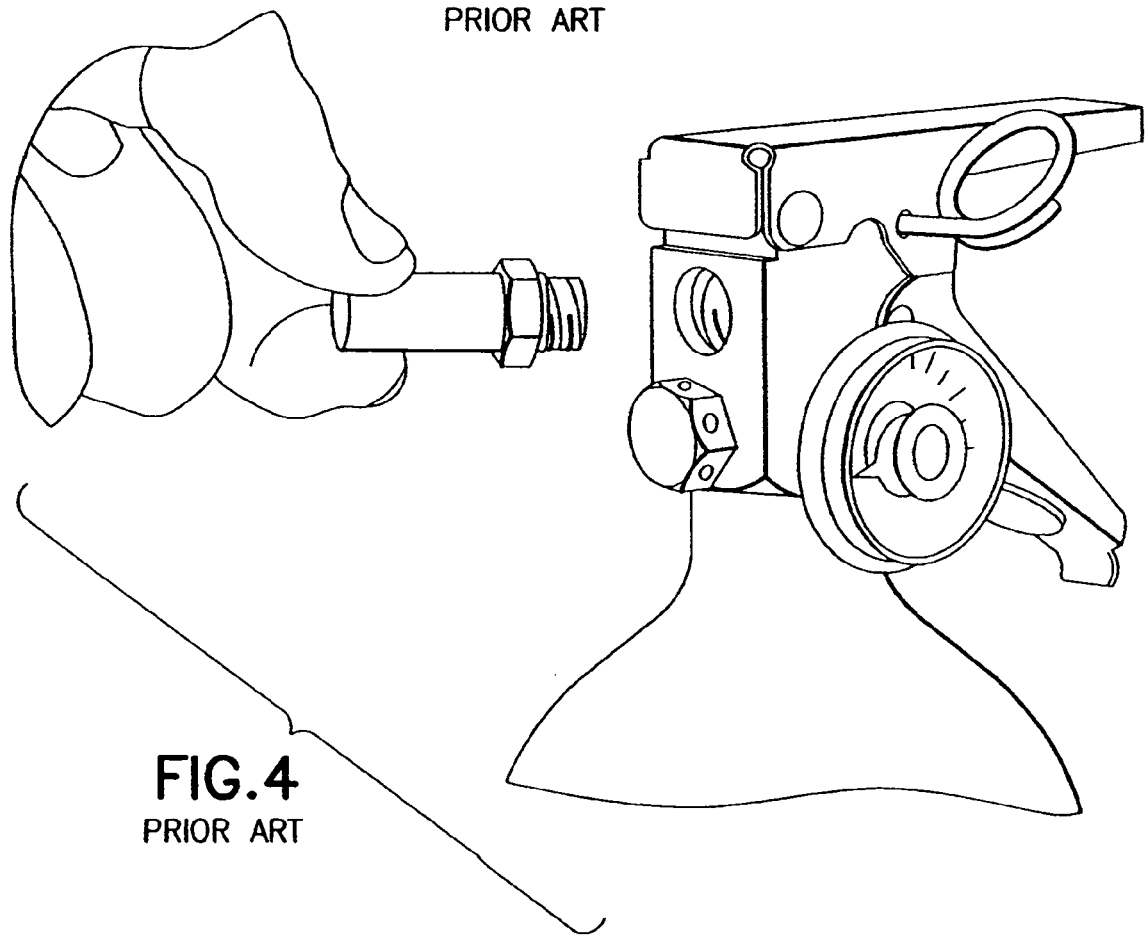

In the first type of system, the outer envelope of the dispensing nozzle is reshaped into a male quick connect fitting so that female quick connect fittings can be quickly attached to the dispenser by the dispensing nozzle itself. In the second type of system, the threading (shown in FIG. 4) in the valve assembly is replaced with a female quick connect fitting. In embodiments of the second type, the dispensing nozzle can be quickly removed from the female quick connect fitting in the valve assembly and anything with a male quick connect fitting can be quickly attached directly to the dispenser itself.

In both types of systems according to the present invention, a user is able to rapidly change whatever operations he or she is presently performing with the liquid dispenser, which may be crucial in certain situations. For example, if the user is engaged in riot control and the less-lethal liquid in the dispenser runs dry, the user can refill the dispenser and either directly connect the pressurizing hose to the dispensing nozzle once it is re-attached (using the first system), or unplug the dispensing nozzle and plug in the pressurizing hose (using the second system). Using either type of system according to the present invention, steps 5 and 10 of the prior art refilling procedure are no longer performed. Using the first type of system, step 4 is also no longer needed.

These systems have advantages in addition to the more expeditious refilling procedure. The user may need to change from one operational mode using the dispensing nozzle to a mode that requires another type of implement. For example, the user may be using the dispenser to disperse an irritant for riot control and then need to spray the irritant behind a door or another type of obstacle. In such cases, a penetrating wand, which is a large needle-shaped sprayer, is held in the user's hand and can thusly be used to penetrate a door or other obstacle and aim the irritant spray through it (or around it). In the prior art, the penetrating wand was permanently threaded onto to the dispenser, thereby requiring the user to carry both a dispenser with a dispensing nozzle and a dispenser with a penetrating wand to get the benefits of both. With the present inventive system, the user can use the same dispenser and switch the dispersal instrument attached to the dispenser (either by plugging the dispensing wand onto the male quick connect fitting or by swapping the dispenser nozzle for the dispenser wand by plugging it into the female quick connect fitting of the valve assembly of the second system).

Figure 5A:
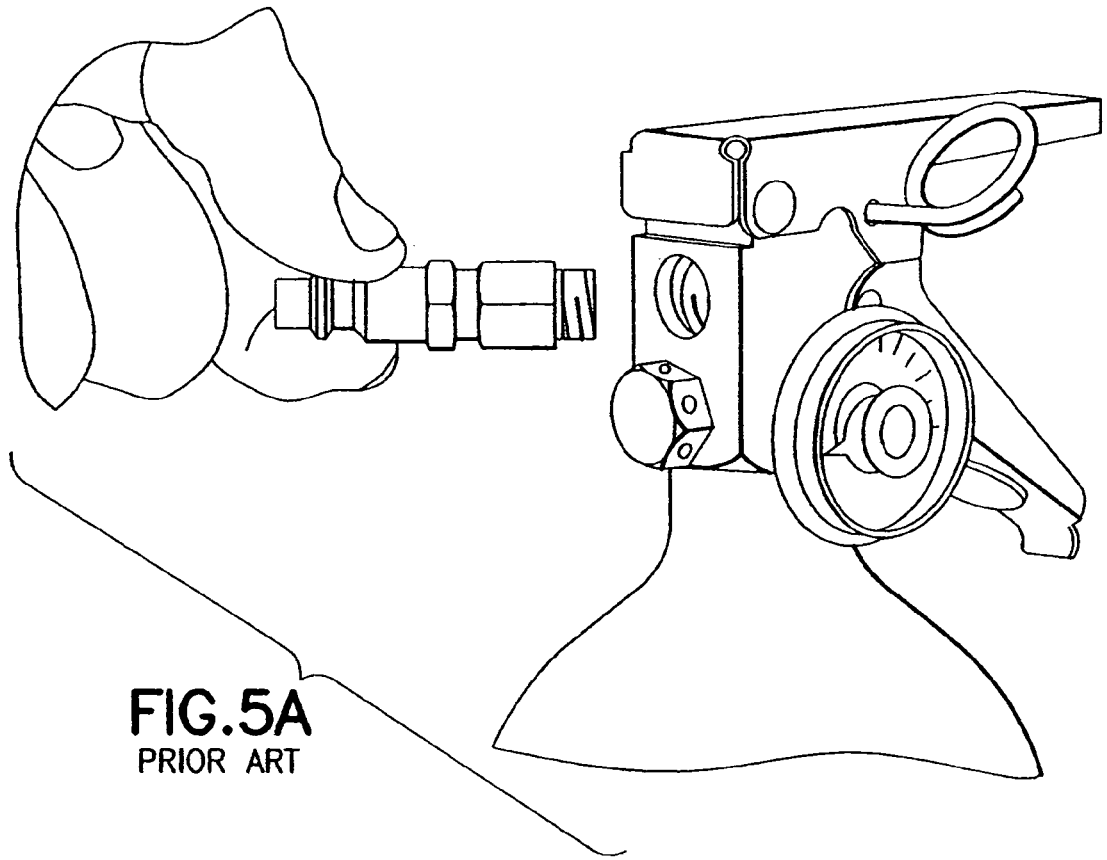
FIGS. 5A-5B shows the step of attaching a male quick connect fitting to the valve assembly according to the prior art.
Figure 5B:
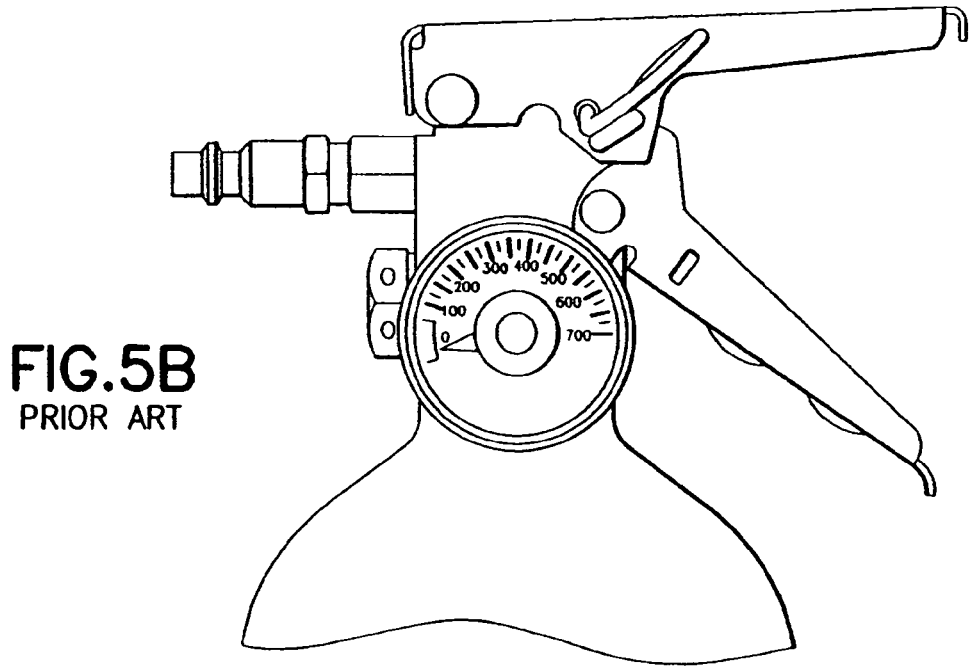
Figure 6A:
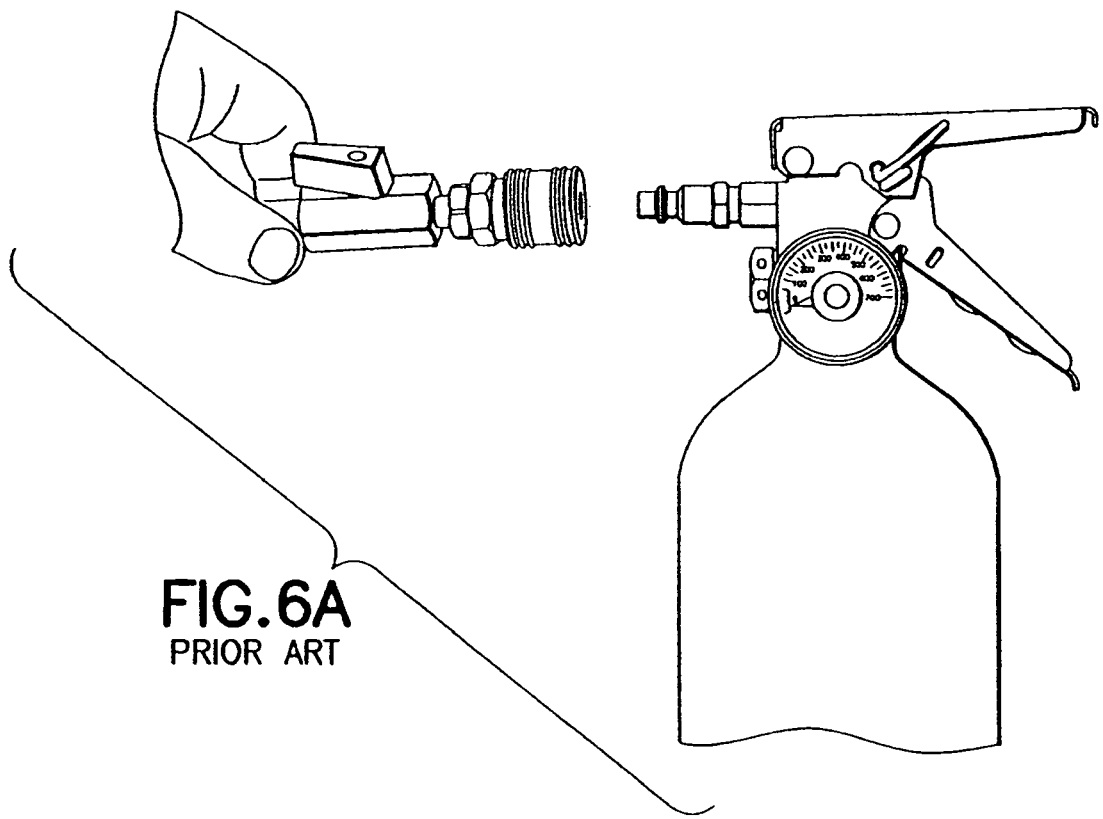
Figure 6B:
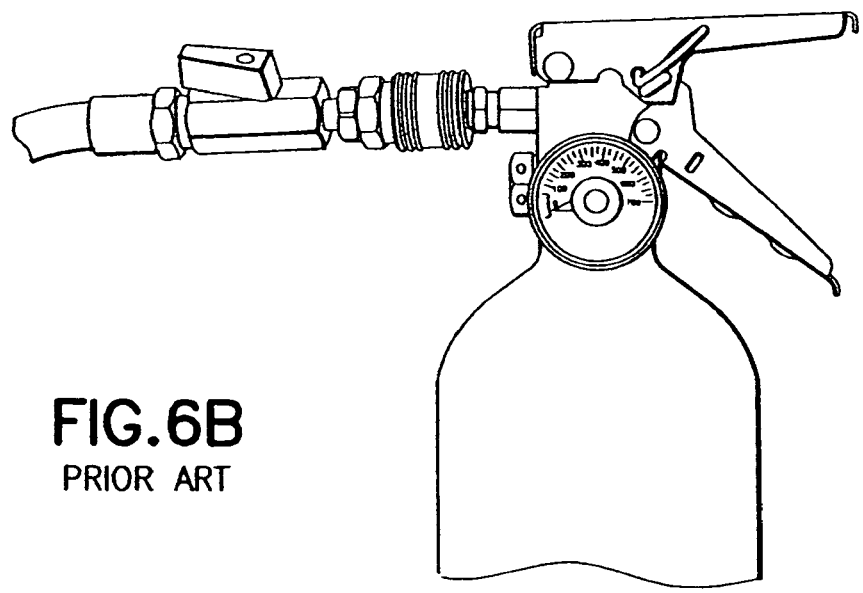

In addition to the benefits of flexibility in tactical situations, the inventive system simplifies and consolidates the various implements used with dispensers (e.g., no more extra quick connect fitting shown in FIGS. 5A and 5B; no more carrying both a penetrating wand dispenser and a normal dispensing nozzle dispenser). Thus, the facilities required for storage and maintenance are reduced.

Figure 8A:
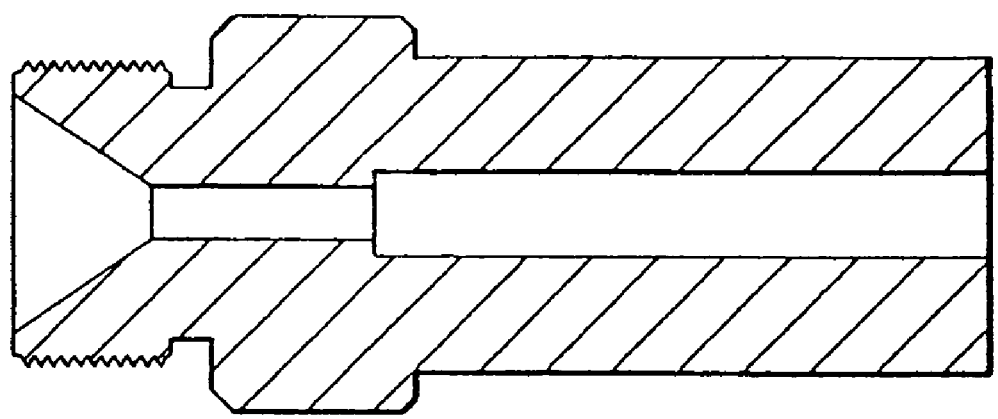
FIG. 8A shows a dispensing nozzle according to the prior art.
Figure 8B:
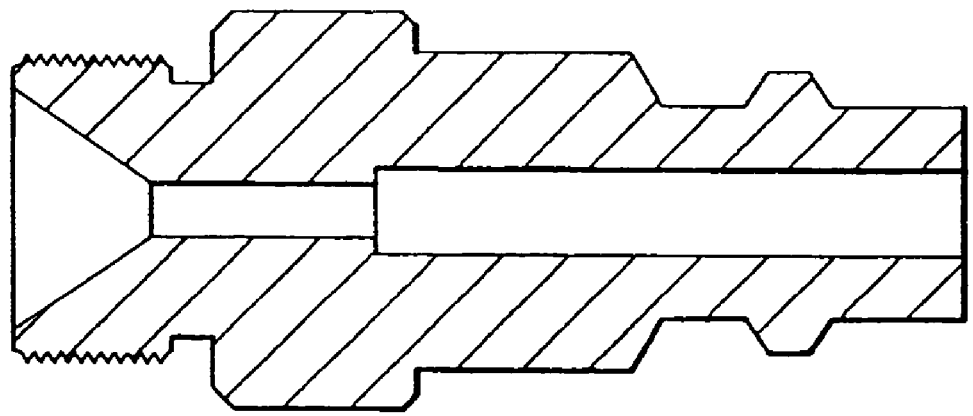
FIG. 8B shows a dispensing nozzle according to a preferred embodiment of the present invention.

A cross-sectional drawing of a presently preferred dispensing nozzle of the first type of quick connect system according to the present invention is shown in FIG. 8B, adjacent to FIG. 8B, which is a cross-sectional drawing of a prior art dispensing nozzle, such as the one shown in FIGS. 1-6B.

In FIG. 8A, the dispensing end of the nozzle is facing right, with the dispensing orifice being on that side. The threading for screwing into the valve assembly of the dispenser is on the left-hand side.

In FIG. 8B, the threading for screwing into the valve assembly is also on the left-hand side, and the dispensing end is on the right-hand side. However, the outer envelope of the dispensing end is shaped as a male quick connect fitting, thus allowing any device with a female quick connect fitting to connect directly to the dispenser through the dispensing nozzle.

As can be seen in the drawing, the inner passageway for the dispersal fluid in the inventive nozzle has the exact same dimensions as the passageway in the prior art dispensing nozzle. Because of this, the streaming outputs of the two nozzles are identical.

Although the inventive nozzle in FIG. 8B shows a dispensing nozzle with an outer envelope shaped like a standard quick connect fitting, the outer envelope could be shaped into a non-standard or proprietary quick connect fitting according to the present invention. This would provide a degree of safety because it would stop one from connecting a potentially harmful device or hose to the dispenser. It is also possible that the outside of the dispensing nozzle could be reshaped as a female quick connect fitting rather than a male quick connect fitting.

In the second type of system according to the present invention, the threading (shown in FIG. 4) in the valve assembly is replaced with a quick connect fitting, thus allowing anything with an opposite quick connect fitting to be quickly attached directly to the dispenser itself. In a presently preferred embodiment of the second type of system, the threading of the prior art valve assembly is replaced with a female quick connect fitting. Thus, in such an embodiment, the dispensing nozzle would consist of a dispensing end having the dispensing orifice and a male quick connect fitting on the other end for attaching to the valve assembly of the dispenser.

A set of interchangeable nozzles could be used with this embodiment (and the others as well), thereby providing the user with a choice of dispersion patterns (e.g., stream, conical spray, different droplet sizes, etc.). If the valve assembly in the second type of inventive system has a female quick connect fitting, the various interchangeable nozzles would require male quick connect fittings to be attached to the dispenser. This might be more useful than the second type inventive system having a male quick connect fitting, which would require the various interchangeable nozzles to have female quick connect fittings, which are more bulky than the male.

To some extent, the difference between the two types of inventive systems is more conceptual than real. For instance, if the dispensing nozzle in FIG. 8B was permanently attached to the valve assembly, it could be considered to be either the first type (because the nozzle has been altered) or the second type (because the nozzle is part of the valve assembly). The present invention is intended to cover the entire spectrum of possible implementations between the two system types, as well as both types of system.

Although a fluid irritant payload (e.g., pepper spray) is mostly discussed in this description, the present invention is intended to cover any less-lethal fluid or gas, including non-lethal foams and glues which could be used for control of hostile individuals or crowds. Furthermore, it is contemplated that the present invention could be used with other hand-held pressurized dispensers, such as fire extinguishers.

It is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hand-held dispenser for targeting a spray of pressurized substance comprising:
    a dispensing nozzle having an internal channel leading to an external orifice out of which is sprayed the pressurized substance, wherein the internal channel of the dispensing nozzle comprises a limited portion having a narrower diameter than the remainder of the internal channel, which has a wider diameter than the limited portion wherein the limited narrow diameter portion of the internal channel communicates with a conical inlet, wherein said external orifice is located on a distal end of said dispensing nozzle, wherein the conical inlet is located on a proximal end of said dispensing nozzle opposite said external orifice, wherein a quick connect fitting is formed from an exterior of the distal end of said dispensing nozzle;
    a valve assembly to which a proximal end of said dispensing nozzle is connected having a controllable valve for providing the pressurized substance to said dispensing nozzle; and
    a container connected to said valve assembly for providing a supply of the substance to be dispensed through said valve assembly to said dispensing nozzle;
    wherein a pressurization hose has a quick connect fitting capable of detachably connecting to the quick connect fitting of the dispensing nozzle, whereby one can pressurize the contents of the container by attaching the pressurization hose to the dispensing nozzle without removing the dispensing nozzle from the valve assembly; and
    wherein a person can carry the hand-held dispenser comprising said dispensing nozzle, said valve assembly, and said container and target the spray of the hand-held dispenser at the same time.

2. The hand-held dispenser of claim 1, wherein the substance comprises a solid, a fluid, and/or a gas.

3. The hand-held dispenser of claim 1, wherein the substance comprises an irritant and the target of the spray of irritant is a human and/or animal.

4. The hand-held dispenser of claim 1, wherein the substance comprises a fire extinguishing material and the target of the spray of fire extinguishing material is a fire.

5. The hand-held dispenser of claim 1, wherein the quick connect fitting of the dispensing nozzle comprises a male quick connect plug.

6. The hand-held dispenser of claim 1 wherein the quick connect fitting of the dispensing nozzle comprises a female quick connect socket.

7. The hand-held dispenser of claim 1, wherein the wider diameter portion of the internal channel communicates with the narrow portion and terminates in the external orifice.

8. The hand-held dispenser of claim 1, wherein the dispensing nozzle sprays the pressurized substance in a dispersion pattern selected from the group comprising a stream, a conical spray, and droplets.

9. The hand-held dispenser of claim 1, wherein the quick connect fitting on the exterior distal end of the dispensing nozzle is a surface of revolution.

10. The hand-held dispenser of claim 1, wherein the pressurized substance enters a widest portion of the conical inlet and exits the narrowest portion of the conical inlet when sprayed.

11. A hand-held dispenser for targeting a spray of pressurized substance comprising:
    a dispensing nozzle having an internal channel leading to an external orifice out of which is sprayed the pressurized substance, wherein the internal channel of the dispensing nozzle comprises a limited portion having a narrower diameter than the remainder of the internal channel, which has a wider diameter than the limited portion, wherein the limited narrow diameter portion of the internal channel communicates with a conical inlet, wherein said external orifice is located on a distal end of said dispensing nozzle, wherein said conical inlet is located on a proximal end of said dispensing nozzle opposite said external orifice, wherein the proximal end of said dispensing nozzle forms a first quick connect fitting;
    a valve assembly having a second quick connect fitting for engaging the first quick connect fitting of the dispensing nozzle, said valve assembly having a controllable valve for providing the pressurized substance to said dispensing nozzle; and a container connected to said valve assembly for providing a supply of the substance to be dispensed through said valve assembly to said dispensing nozzle;

wherein a pressurization hose has a quick connect fitting capable of detachably connecting to the second quick connect fitting of the valve assembly, whereby one can pressurize the contents of the container by attaching the pressurization hose directly to the valve assembly without needing an intermediate coupling; and wherein a person can carry the hand-held dispenser comprising said dispensing nozzle, said valve assembly, and said container and target the spray of the hand-held dispenser at the same time.

12. The hand-held dispenser of claim 11, wherein the substance comprises a solid, a fluid, and/or a gas.

13. The hand-held dispenser of claim 11, wherein the substance comprises an irritant and the target of the spray of irritant is a human and/or animal.

14. The hand-held dispenser of claim 11, wherein the substance comprises a fire extinguishing material and the target of the spray of fire extinguishing material is a fire.

15. The hand-held dispenser of claim 11, wherein the first quick connect fitting comprises a female quick connect socket, and the second quick connect fitting comprises a male quick connect plug.

16. The hand-held dispenser of claim 11, wherein the first quick connect fitting comprises a male quick connect plug, and the second quick connect fitting comprises a female quick connect socket.

17. The hand-held dispenser of claim 11, wherein the internal channel of the dispensing nozzle comprises a limited portion having a narrower diameter than the remainder of the internal channel, which has a wider diameter than the limited portion.

18. The hand-held dispenser of claim 11, wherein the pressurized substance enters a widest portion of the conical inlet and exits the narrowest portion of the conical inlet when sprayed.

19. A method for pressurizing a hand-held dispenser capable of targeting a spray of pressurized substance, said hand-held dispenser comprising a dispensing nozzle connected to a valve assembly connected to a container of the pressurized substance, comprising the steps of:

connecting a quick connect fitting of a pressurization hose to either a quick connect fitting formed from a distal end of the dispensing nozzle of the hand-held dispenser or a quick connect fitting formed in the valve assembly of the hand-held dispenser;

pressurizing the container using the pressurization hose connected to said either the dispensing nozzle or the valve assembly of the hand-held dispenser; and disconnecting the quick connect fitting of the pressurization hose from said either the quick connect fitting formed from the distal end of the dispensing nozzle of the pressurized irritant dispenser or the quick connect fitting formed in the valve assembly of the pressurized irritant dispenser;

whereby one can pressurize the contents of the container by attaching the pressurization hose directly to said either the dispensing nozzle or the valve assembly without needing an intermediate coupling;

wherein, if the quick connect fitting of the pressurization hose is connected to the quick connect fitting formed from the distal end of the dispensing nozzle of the pressurized irritant dispenser, one can pressurize the container without removing the dispensing nozzle from the valve assembly; and wherein a person can carry the band-held dispenser and target the spray of the hand-held dispenser at the same time.

20. The method of claim 19, wherein the substance comprises a solid, a fluid, and/or a gas.

21. The method of claim 19, wherein the substance comprises an irritant and the target of the spray of irritant is a human and/or animal.

22. The method of claim 19, wherein the substance comprises a fire extinguishing material and the target of the spray of fire extinguishing material is a fire.

23. The method of claim 19, wherein the quick connect fitting of the pressurization hose comprises a female quick connect socket.

24. The method of claim 19, wherein the quick connect fitting of the pressurization hose comprises a male quick connect plug.

* * * * *